US006938019B1

(12) United States Patent
Uzo

(10) Patent No.: US 6,938,019 B1
(45) Date of Patent: Aug. 30, 2005

(54) METHOD AND APPARATUS FOR MAKING SECURE ELECTRONIC PAYMENTS

(76) Inventor: Chijioke Chukwuemeka Uzo, 11-G Parkwood Dr., South Amboy, NJ (US) 08879

(*) Notice: Subject to any disclaimer, the term of this patent is extended or adjusted under 35 U.S.C. 154(b) by 226 days.

(21) Appl. No.: 09/650,293

(22) Filed: Aug. 29, 2000

(51) Int. Cl.7 .......................... G06F 17/60; G09C 3/00
(52) U.S. Cl. ......................... 705/65; 705/66; 705/67; 705/68; 705/69; 705/71; 705/75; 705/76; 705/77; 705/78; 380/268
(58) Field of Search ..................... 705/26, 27, 65–69, 705/75–78; 380/21–24, 26

(56) References Cited

U.S. PATENT DOCUMENTS

| | | | |
|---|---|---|---|
| 5,590,197 A * | 12/1996 | Chen et al. .................... 380/24 |
| 5,613,012 A * | 3/1997 | Hoffman et al. ............. 382/115 |
| 5,790,677 A * | 8/1998 | Fox et al. ....................... 705/78 |
| 5,825,881 A * | 10/1998 | Colvin, Sr. .................... 380/24 |
| 5,839,119 A * | 11/1998 | Krsul et al. .................... 705/39 |
| 5,883,810 A * | 3/1999 | Franklin et al. ......... 364/479.02 |
| 5,974,146 A * | 10/1999 | Randle et al. ................. 380/24 |
| 6,076,078 A * | 6/2000 | Camp et al. ................... 705/65 |
| 6,105,008 A * | 8/2000 | Davis et al. ................... 705/41 |
| 6,175,827 B1 * | 1/2001 | Cordery et al. ............. 705/410 |
| 6,236,981 B1 * | 5/2001 | Hill .............................. 705/67 |

(Continued)

FOREIGN PATENT DOCUMENTS

EP   1 111 528 A2 *   6/2001   ........... G06F 17/60

(Continued)

OTHER PUBLICATIONS

Garceau, Linda "Internet Fraud", Ohio CPA Journal, v59n3, Jul.-Sep. 2000. Retrieved from Dialog File:15, Acc#: 02066061 58017954.*

*Primary Examiner*—James P. Trammell
*Assistant Examiner*—Daniel L. Greene
(74) *Attorney, Agent, or Firm*—Cowan, Liebowitz & Latman P.C.; Mark Montague

(57) ABSTRACT

In accordance with the present invention, consumers and merchants use computing devices connected to a network, such as the Internet, through wired and wireless means, wherein the consumer connects to a clearing server device to purchase or retrieve previously purchased token, the consumer then connects to the merchant's computer or website to attain price quotes of goods and services, selects the goods and/or services to be purchased, and then communicates a request for purchase to the merchant. The merchant then communicates a request for an update key to the clearing server. The update key is used as an authorization to modify the value of the token. To debit the customer the decrement key is requested and to credit the customer an increment key is asked for. An overwrite key is another type of update key. Together with the overwrite key a replacement token is provided to the merchant who in turn forwards the new token to the customer. As an aspect of the invention, if the token was not previously used, the clearing server simply issues the update key. If, however, it is determined that the token was used, the amount paid by the consumer to a previous merchant is determined the token adjusted and the overwrite key together with the new token is returned to the merchant. The merchant then forwards the purchased merchandise, the update key, and possibly a new token to the consumer.

26 Claims, 11 Drawing Sheets

Data Paths

U.S. PATENT DOCUMENTS

| | | | |
|---|---|---|---|
| 6,240,187 B1 * | 5/2001 | Lewis | 380/282 |
| 6,246,771 B1 * | 6/2001 | Stanton et al. | 380/286 |
| 6,363,365 B1 * | 3/2002 | Kou | 705/64 |
| 2001/0005839 A1 * | 6/2001 | Maenpaa et al. | 705/65 |
| 2001/0014878 A1 * | 8/2001 | Mitra et al. | 705/39 |
| 2002/0002538 A1 * | 1/2002 | Ling | 705/41 |
| 2002/0035694 A1 * | 3/2002 | Frenkel et al. | 713/193 |
| 2002/0095389 A1 * | 7/2002 | Gaines | 705/67 |
| 2002/0111907 A1 * | 8/2002 | Ling | 705/41 |
| 2003/0061170 A1 * | 3/2003 | Uzo | 705/64 |

FOREIGN PATENT DOCUMENTS

| | | | | |
|---|---|---|---|---|
| WO | WO 01/67407 A1 * | 9/2001 | | G07F 19/00 |

* cited by examiner

| Consumer ID | Database Alias | Encrypted Consumer ID | Encrypted Time and Date (GMT) | Token Amount | Encryption Key Code | Encrypted Token Amount | Merchant ID (Merchant of Last Purchase) | Encrypted Hash value of Token | Encrypted Clearing Server Signature | Unique Random Number | Last Merchant URL |
|---|---|---|---|---|---|---|---|---|---|---|---|
| 70 | 72 | 74 | 76 | 78 | 80 | 82 | 84 | 86 | 88 | 90 | 92 |

68

Figure 3

METHOD AND APPARATUS FOR MAKING SECURE ELECTRONIC PAYMENTS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates to making electronic payments on the Internet, and more specifically to providing a secure electronic money proxy to enable unrestricted commerce on the Internet.

2. Description of the Background of the Invention

At a minimum, electronic payments involve transmissions between three parties, a consumer, a merchant, and any credit or money disbursing institution, e.g., a bank or a credit union, (creditor). In exchange or in payment for goods and/or services, the consumer gives or issues a non-cash electronic instrument or a money-proxy to the merchant. For the remainder of this document such instrument will be referred to as a token. The creditor validates the token, by verifying that cash or credit backs it. The creditor's validation enables the merchant to release the goods and/or services purchased to the consumer.

It is possible for the consumers and merchants to engage in transactions without the creditor. However, in such two-party transactions the issuance of the token by the consumer will be synonymous with creating money. Such eventuality is not suitable for the merchant, because he or she will be asked to accept the token without any assurances as to its value. It is presumed that the merchant must be able to use this token either in further trade, e.g., to purchase replacement merchandise, or redeem it for generally accepted currency.

Another drawback to the two party transactions involving multiple uses or spending of the token is the current state of electronic encryption. It is not possible given today's technological advances, to guarantee transactional security.

Three party transactions, including the consumer, merchant, and creditor, must be considered the minimum number of participants needed for electronic payments. However, every electronic payment transaction may involve different consumers and merchants, each with a different creditor. Furthermore, such electronic payment transactions may allow several possible methods of payment.

An efficient transaction structure would require the introduction of a fourth party. This fourth party will validate every consumer's token, irrespective of which creditor the consumer uses or the type of payment instrument, e.g., credit or debit card, credit line, check, or cash, used to purchase the token. The fourth party ensures that the consumer's token does in fact have its stated cash value and thereby eliminates merchant concerns regarding the token value. Therefore the token may be easily accepted by the merchant, redeemed as cash, or used to make merchandise replacement purchases.

Developments in the electronic payment area may be divided into two categories:

1. The first category consists of those approaches that address a subset of a payment transaction but are not in themselves complete solutions. These make up the vast majority of electronic payment developments. An example of this category is best described in U.S. Pat. No. 5,987,140. This patent presents a method of secure communication between the consumer, merchant, and creditor where authorizations are passed from the creditor to the merchant and to the consumer. Another example of this category is described in U.S. Pat. No. 5,999,91, where probabilistic polling of the merchant is used to permit the creditor to obtain an approximation of the consumer's spending. Moreover, U.S. Pat. No. 6,035,402 describes the use of an electronic Certification of Authority, used to authenticate the identity of the consumer, merchant, and/or creditor.

2. The second category of developments consists of those developments that may be considered as complete solutions, designed to conclude a transaction between the consumer and the merchant from initiation or contract to completion or sale. An example of such approach is described in U.S. Pat. No. 5,952,638. This patent describes an electronic transaction initiated by a consumer who transmits a request for payment information to a merchant. The merchant's response is authenticated, after which the consumer generates an electronic payment. This electronic payment is then forwarded to the merchant as payment for the goods and/or services.

The complete solutions category of approaches can in turn be subdivided into solutions implemented exclusively using software and solutions requiring special hardware, e.g., smart cards, to operate. The special hardware is generally designed such that neither the merchant nor consumer can access or modify information stored on the hardware. An example of such hardware based electronic payment invention is described in U.S. Pat. No. 6,061,664. In that patent, a consumer can communicate with the merchant and conclude a transaction with a payment. However, such transaction requires specialized hardware including a smart card and a phone or voice communication device.

An example of a solutions implemented using exclusively software is described in U.S. Pat. No. 6,029,150. In that patent each consumer is burdened by an obligation to maintain an account with at least one of several agents. The consumer receives a price quote from a merchant, authenticates it, and sends that quote to an agent. The merchant must have an account with that agent. The agent then in turn issues an authenticated token to the consumer. The consumer then forwards all or part of that token to the merchant as payment.

The software solutions may permit exchange of the tokens between the consumers and merchants. The tokens can be stored, retrieved, and exchanged multiple times between the consumers and merchants to pay for the goods and services. In other words, the multi-use token system mimics the characteristics associated with the use of physical cash.

Alternatively, tokens may be used no more than once and thereafter modified or destroyed in a single-use token system. The complete software-based solutions are further categorized into real time and non-real time token systems.

The non-real time token systems include electronic verification, negotiation, secure communication, authentication, payment instrument selection, etc. Although transactions can be concluded using these non-real time systems, the function of such systems is conceptually akin to making payments by check to the merchants who will wait three days for the check to clear before shipping or releasing the goods and services. Such systems lack "immediacy" of the transaction. A good example of the non-real time token systems is described in U.S. Pat. No. 6,029,151. In this patent, charges incurred by the consumer are charged to his/her Internet Service Provider (ISP). This requires active participation of the consumer's ISP in the transaction. Settlement of charges for this model occurs only after the consumer receives his/her bill and pays it.

The real time token systems use the tokens to complete transactions in real-time. This is achieved by the consumer making a payment for goods and/or services through sending a token to the merchant; the merchant verifies and decrements the token; after which the goods or services purchased are released. The payments made through the real-time token systems are not any of the following actions: a negotiation to choose a form of payment, a method for verifying if the consumer is credit-worthy, a secure channel to communicate between transaction parties, a method to create a token. In their function, the real-time token systems are conceptually akin to cash transactions. Pay cash; receive goods. While the goods may take time to ship or download over computer networks, the purchase transaction has, in essence, been consummated.

There exists a number of various types or real-time token systems. First, there are those systems that depend on, or specify a particular protocol through the use of which electronic payments are transacted. An example of such protocol dependent real-time token systems is described in U.S. Pat. No. 6,061,665, which specifies a method of communication between the consumer and merchant having a dynamically negotiated payment protocol, message format, and suitable payment instrument.

Another type of real-time token system requires one or more parties in addition to the consumer, the merchant, and the creditor. Without these additional required parties, e.g., a Certificate Authority for issuing encryption/decryption keys, the transaction cannot be concluded.

Finally, another type of the real-time token system requires a priori arrangement in which the consumer or merchant would not otherwise engage in except for the purpose of prosecuting electronic payments. Such system may require that each merchant maintain an account with at least one of several creditors, or that each consumer maintain an account with every merchant with whom they transact, or that each consumer obtain encryption and decryption keys. An example of such real-time token system requiring a priori arrangement is described in U.S. Pat. No. 5,930,777. This patent describes a method for charging a consumer for the use of on-line information. The method requires the consumer to establish an account with at least one third party "banker" and to purchase "credit units" that have denominations that can be as small as fractions of one cent. The consumer may have accounts with more than one "banker" and may use these credit units to make on-line purchases.

In view of the foregoing discussion, it is clear that there is a need for a complete, protocol independent, real-time payment, single use, token system that is software based and does not depend on additional hardware. The system must be able to execute multiple ensuing transactions between the same consumer and merchant using sole authentication, which will lead to significant reductions in networking and computational overhead. The system should not require a Certificate Authority or additional agents beyond the consumer, merchant, and creditor clearing server (representing a fourth party).

OBJECTS AND SUMMARY OF THE INVENTION

It is therefore an object of the invention to provide apparatus and a method for making secure electronic payments that overcomes the shortcomings of the above-described systems.

These and other objects of the invention will become more apparent from the discussion below.

In accordance with the present invention, consumers and merchants use computing devices connected to a network in a wired or wireless manner, such as the Internet, wherein the consumer connects to a clearing server device to purchase or retrieve previously purchased token, the consumer then connects to the merchant's computer or website to attain price quotes of goods and services, selects the goods and/or services to be purchased, and then communicates a request for purchase to the merchant. The merchant then communicates a request for an update key to the clearing server. The update key is used as an authorization to modify the value of the token. To debit the customer the decrement key is requested and to credit the customer an increment key is asked for. An overwrite key is another type of update key. Together with the overwrite key a replacement token is provided to the merchant who in turn forwards the new token to the customer.

As an aspect of the invention, if the token was not previously used, the clearing server issues the update key. If, however, it is determined that the token was used, the amount paid by the consumer to a previous merchant is determined, the token adjusted and the overwrite key together with the new token is returned to the merchant. The merchant then forwards the purchased merchandise, the update key, and possibly a new token to the consumer.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which:

FIG. 3 is a record layout diagram of a token utilized for making payments according to the invention.

DETAILED DESCRIPTION OF A PREFERRED EMBODIMENT OF THE INVENTION

The method and apparatus for making secure electronic payments in accordance with the present invention, involves making electronic payments over the Internet. The present invention is a complete, software-based, real-time, payment system that does not depend on additional hardware, is protocol independent, runs on existing hardware infrastructure, and uses symmetric or asymmetric (public/private key) encryption. The invention does not require a Certificate Authority or additional agent beyond a consumer, merchant, creditor, and a server. The invention may be used to make payments as well as to receiving refunds, promotions, credits, etc.

Figure 1:
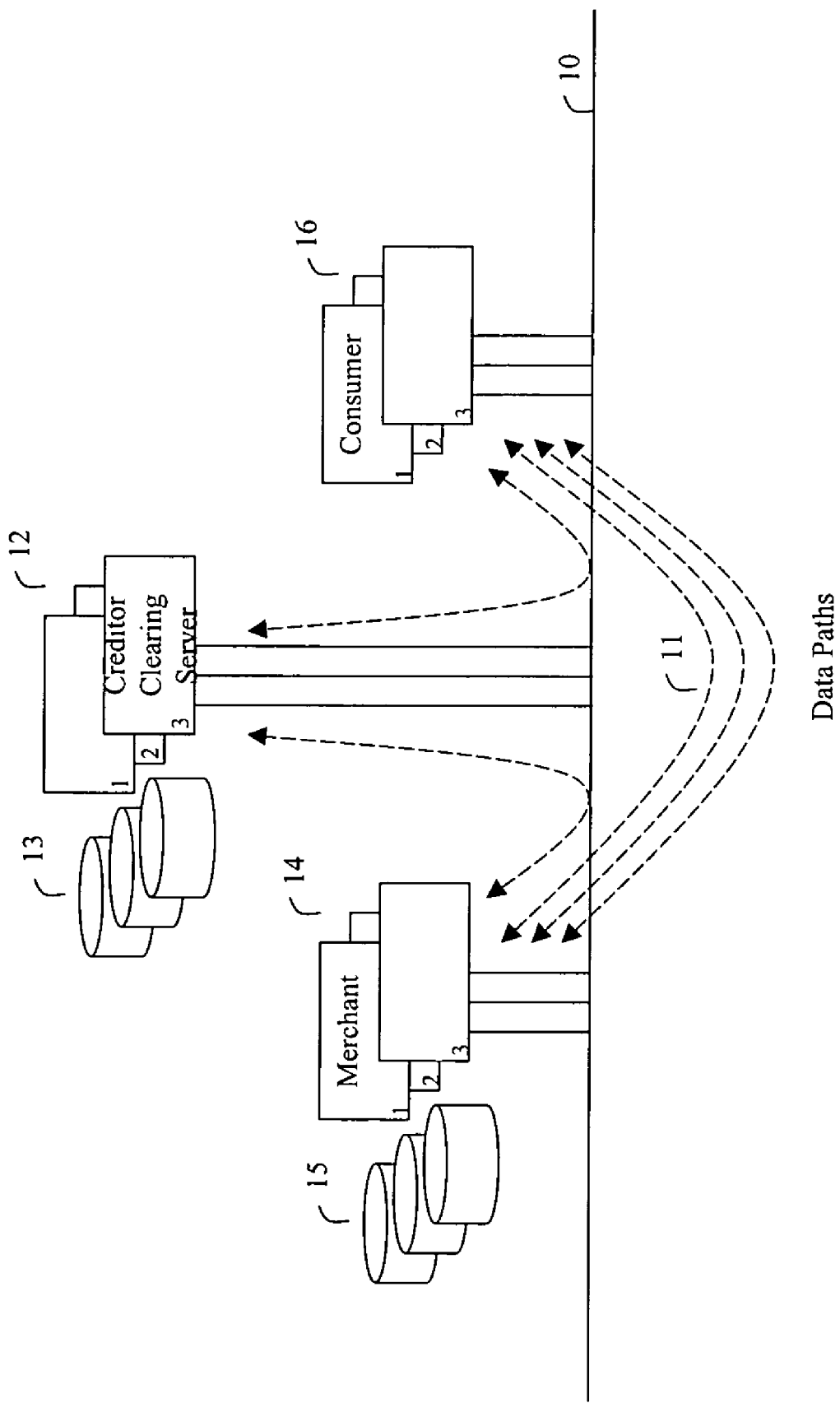
FIG. 1 is a diagram representing a network environment of the present invention.

Referring to the drawings, FIG. 1 shows computing devices of the invention inter-connected via data paths 11 over a network 10. In the preferred embodiment of the invention, the network 10 is the Internet. The computing devices are functionally grouped as merchant 14, consumer 16, and creditor clearing server 12. The creditor clearing servers 12 include clearing server databases 13 and processes for managing them. The creditor-clearing servers 12 also interact with creditors, e.g., banks and credit card companies, whose authorization attaches a value to electronic money called a token which is used to make transactions between merchants 14 and consumers 16.

Figure 2:
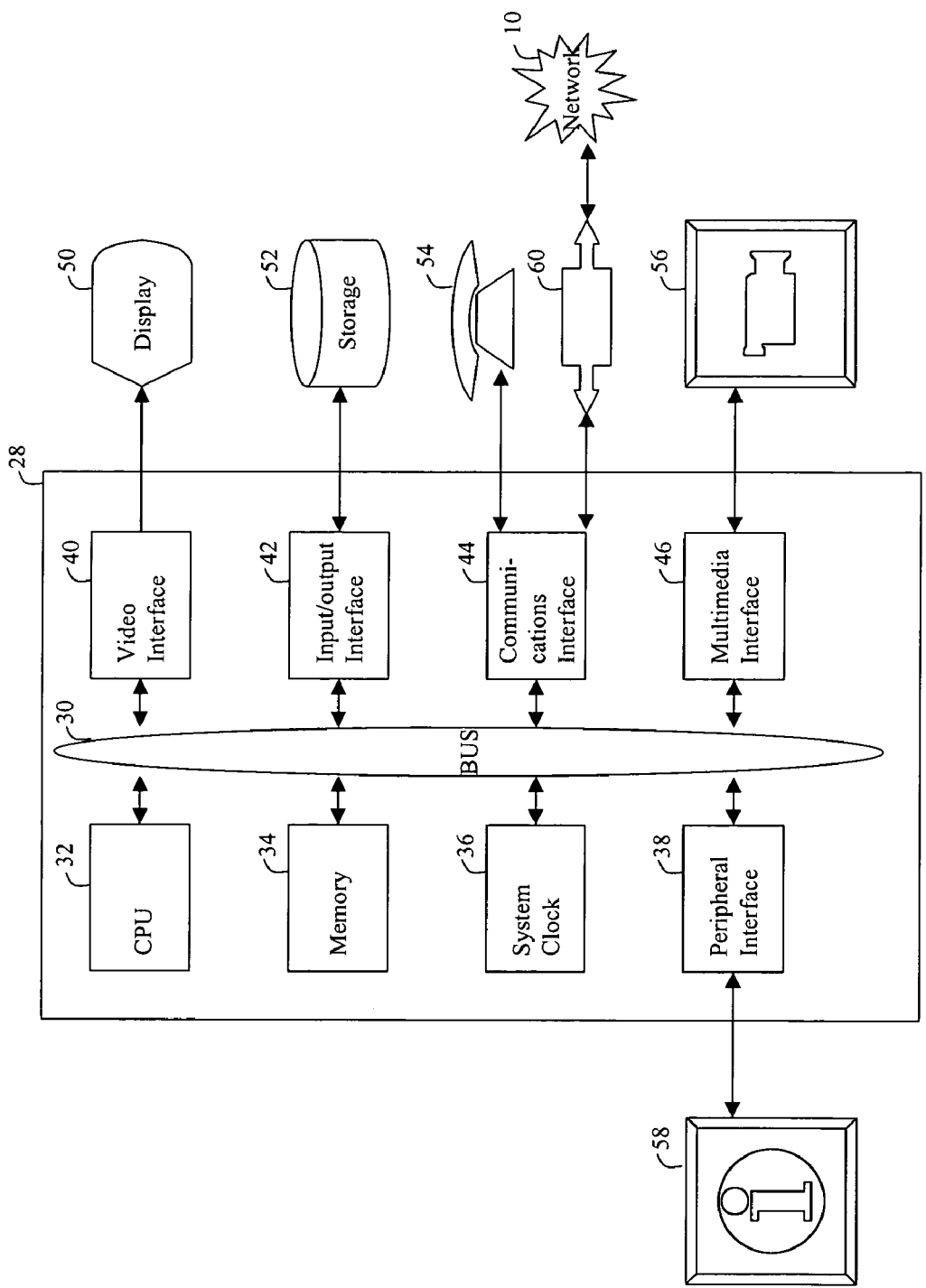
FIG. 2 is a diagram representing component of computing devices utilized for the present invention.

The computing devices 12, 14, and 16 may take the configuration of any computer ranging from mainframes and personal computers (PCs) to digital telephones and hand held devices, e.g., Palm Pilots™. In one illustrative embodiment of this invention shown in FIG. 2, such computing devices may comprise a bus 30, which is connected directly to each of the following: a central processing unit (CPU) 32; a memory 34; a system clock 36; a peripheral interface 38; a video interface 40; an input/output (I/O) interface 42; a communications interface 44; and a multimedia interface 46. The common bus 30 is further connected via the video interface 40 to a display 50; via the I/O interface 42 to a storage device 52, which may illustratively take the form of memory gates, disks, diskettes, compact disks (CD), digital video disks (DVD), etc.; via the multimedia interface 46 to at least one multimedia component 56; via peripheral interface 38 to one or more peripherals 58, such as a keyboard, a mouse, navigational buttons, e.g., on a digital phone, a touch screen, and/or writing screen on full size and hand held devices, e.g., a Palm Pilot™; via the communications interface 44, e.g., a plurality of modems, to a network connection 60, e.g., an Internet Service Provider (ISP) and to other services, which is in turn connected to the network 10, whereby data paths 11 are provided over the network 10 and between the computing devices 12, 14, and 16 (FIG. 1) and, in particular, the common bus 30 of each of these computing devices; and furthermore, via the communications interface 44 to the wired and/or the wireless telephone system 54.

Referring back to FIG. 1, to participate in a transaction a first-time consumer 16, using commercially available browsing programs such as the Microsoft Explorer and Netscape Navigator, contacts the clearing server 12. There the consumer is requested to provide personal information, to select a password, and to pay for a token, the electronic money representing cash. The consumer uses existing payment methods, e.g. a credit card, a debit card, a prepaid card to pay for the token. Offline payment methods such as checks, money orders, cash may also be used but will mean that those portions of the transaction will not be completed online and so the token will not be issued until they are completed. The provided information is stored in the clearing server databases 13, which comprise various records including (1) merchant information, (2) consumer information, (3) anonymous consumer prepaid card and/or cash information, and information specific to the clearing server 12, such as the computing device signatures and encryption key codes.

Consumer

As mentioned above, to purchase the token the consumer using the browsing program enters information, such as credit, debit, or prepaid card reference numbers into a secure form page on the clearing server 12. The consumer is asked to select a password and a login id. The accepted information is stored in the clearing server database 13 as a unique consumer record and is used to create and update the token being purchased. Although all the information may be stored in one table, using three tables in an illustrative embodiment of the present invention permits splitting the information into:

a. Static consumer information records comprising the following fields: a consumer ID; a first, middle, and last name; e-mail; city and country; database alias; software downloaded (Y/N); and software version. The software referenced in the last two fields will be discussed below.

b. Consumer secret information records comprising the following fields: a consumer ID; a payment instrument name and type, e.g., visa, master card, debit card, prepaid card, other; a name of the owner of the instrument; an instrument number and expiration; a login name; an encrypted password; an encrypted password reminder; the dollar amount purchased or face value of the token at purchase; date and time; and authorization information.

c. Changing consumer information records change each time the clearing server 12 updates the token, they comprise the following fields: a consumer ID; a first random number used to generate an update key; a second random number used to generate an overwrite key; a token balance; a last merchant purchased from; the second to last merchant purchased from; a requesting merchant; the request time; and a token hash value.

Where the consumer wishes to remain anonymous, the prepaid card records having a schema similar to the consumer records may be used. The main exception to creation of the consumer record is that the record has been pre-created in the clearing server database 13 and has as its consumer ID a number assigned to the prepaid card. The prepaid card record has numbers in the fields for first, middle, and last names, e-mail, and city and country names. Instead of entering his or her name, the consumer enters the prepaid card number and is prompted to enter the login name and password. This allows the consumer to retrieve the tokens purchased with the prepaid card.

Merchant

The merchants 14 using computing devices, desiring to participate in the inventive process will follow a similar route. Using commercially available Internet browsing programs, data paths 11 to the clearing server 12 are established and information, such as the name, e-mail, uniform resource locator (URL) or the TCP/IP address associated with the merchant's 14 computing device or Internet website, creditor, and creditor account number are entered. This information is used to authenticate the merchant 14 and in order to download software from the clearing server 12. The merchant record, which is stored in the clearing server database 13, holds static information about the merchant, detailed transaction information for each consumer and aggregate transaction information. The aggregate transaction information with the same schema is created by the merchant 14 in a merchant database 15. This merchant database 15 is accessed when the clearing server 12 polls the merchant 14 to retrieve the latest transactional information. As will be discussed below, the clearing server 12 may thus obtain the total amount spent by the consumer 16 at the merchant 14 website and then update the token to reflect this amount. In the illustrative embodiment of the present invention, the merchant information records, similar to the consumer information records, may be maintained as the following record sets.

a. Static merchant information records comprising the following fields: a merchant ID; name; URL; e-mail; address; login name; password (encrypted); a type of merchant business; date created; a software version; an encryption code; a merchant creditor's name; a creditor account number; a creditor routing number; and an authorized flag (y/n).

b. Aggregate merchant and consumer information records include the following fields: a merchant id; a consumer id (foreign key); a sum of consumer purchases; a total merchant credit; a total merchant debit; a net merchant credit; a date; and a time.

c. Merchant transaction information records comprising the following fields: a date; a merchant id; a consumer id; a product or service purchased; a consumer debit (token decrement); a consumer credit (token increment); and time.

Clearing Server

Finally, the clearing server database 13 comprises records containing fields specific to the clearing server 12. The clearing server information records comprise the following fields: a clearing server signature; an encryption key code; a message to be authenticated (unencrypted); a message to be authenticated (encrypted). These fields are extracted in creating a token or in creating a message on the clearing server's "authentication page" to be used for authenticating of the merchants and consumers. The clearing server signature field is extracted from the clearing server information record, encrypted and written to the token. The merchant 14 maintains a digital copy of the unencrypted signature. The encryption key code is an alias for the key and type of encryption used by the clearing server 12. This encryption key code, as will be described below in detail, is written to the token. The merchant using the old encryption key cannot decrypt information written with a new encryption key. Periodic updates of the merchant's encryption key enable the merchant to use the new encryption key and to store a new clearing server signature.

The "message to be authenticated" fields hold a phrase, which is stored with and without encryption. The clearing server 12 provides the encrypted phrase, after which either the consumer or merchant 14 and 16 may access this phrase and attempt to decrypt it. The results are then uploaded to the clearing server 12. The consumer and/or merchant 14, 16 will receive a confirmation for successful decryption. Depending on the encryption algorithm being used, the message may be unencrypted and the consumer or merchant 14, 16 would then be required to encrypt it and upload the results to the clearing server 12. The present invention may use commercially available encryption algorithms.

It is appreciated that one skilled in the art could have used other methods of database design without departing from the scope of the invention.

Token

The token issued by the clearing server 12, holds encrypted and unencrypted data in a format that permits access to specific portions of the data. The format of the token may vary from numbering of each data segment to giving each data segment a specific header. Conceptually, the token may be made to resemble a record with fields. Encryption is performed only on the clearing server 12 while decryption is performed by the merchant 14. Any robust commercially available encryption algorithm—symmetric or asymmetric—may be used to encrypt and decrypt token data. The token contains several fields of data designed to be used for authentication. As a result the merchant 14 using any or all of several alternative methods involving different fields may authenticate the token. For example, decrypting the clearing server's signature field may authenticate a token.

Each token may hold encrypted information, which may include at a minimum, the consumer's name and financial information, the token's cash value amount, date and time, and a unique identifier. In situations where the token was purchased for cash or through the use of anonymous prepaid instruments, the encrypted information comprises a consumer's number instead of the consumer's name to represent the consumer. The token resides in memory 34 of the computing devices 14, and 16 and is therefore difficult to access or tamper with. Moreover, after each transaction the token is essentially destroyed. Encryption and decryption of the token is performed by software, is invisible to the consumer and merchant, and does not depend on any particular encryption algorithm. Any commercially available secure encryption methods, e.g. symmetric or asymmetric public/private key, may be used.

The token is dynamically generated from the information stored in tables of the clearing server databases 13, and holds encrypted and unencrypted information identifying the consumer. A symbolic representation of a token is provided in FIG. 3. The fields of the token record 68 address the following functions:

1. The consumer id field 70 is a unique key representing the consumer. It is a primary key field in the consumer record of the clearing server database 13 (FIG. 1). The clearing server 12 (FIG. 1) creates the consumer id field 70 for each consumer 16 when the consumer purchases the token 68.

2. A database alias field 72 is a reference name to identify to the clearing server database 13 where this consumer's record resides. Since there might be several clearing server databases 13, this field lets the clearing server 12 know which clearing server database 13 to contact in order to obtain consumer information with which to create or update the token 68.

3. An encrypted consumer id field 74 is only readable by the clearing server 12, which can decrypt this field and check it against the unencrypted consumer id to make sure the token 68 is authentic.

4. An encrypted date and time (Greenwich Mean Time) field 76, stores information when the token 68 was created. Every time the clearing server 12 modifies the token 68, this field 76 is updated in the token 68 and on the clearing server database 13. The token 68 may be given a fixed life expectancy after which time it is removed from the memory 34 of the consumer 16. In such cases, if for example the token 68 cannot have a life longer than 4 hours for example, but the time field 76 shows that the token 68 is, e.g., 12 hours old, then the token 68 is not genuine.

5. A token amount field 78 is modified by the merchant 14 (FIG. 1) and may be read by the consumer 16 (FIG. 1).

6. An encryption key code field 80 is a code for the key used by the clearing server 12 to encrypt the information on the token 68. The token 68 that is encrypted with an old encryption key when a new encryption key is being used will be detected and recognized as a fake.

7. An encrypted token amount 82 is used to compare the value of this field with the value of the unencrypted token amount field 78. If the values don't match, it means that decrements have been made to the token 68 of which the clearing server 12 is unaware. If this happens, the last merchant 14 with whom a transaction was made is polled to obtain updates. When the transactions are obtained from the merchant 14 the encrypted token amount in the field 82 is updated to match the unencrypted token amount in the field 78.

8. A unique ID field 84 is the id of the last merchant 14 from whom a purchase was made. This is a unique merchant identifier maintained on the clearing server database 13 to identify the last merchant 14 with whom the token 68 was used in a transaction. The field 84 may be empty if no transaction has been made since the time that the token 68 was created or purchased.

9. A hash value of token field 86 represents a number obtained by executing specific fields on the token 68 using any commonly available hashing algorithms that generates a unique value. This value is encrypted. The merchant 14 runs these specific fields through the same hashing algorithm to obtain a number to compare with the number obtained when this field 86 was decrypted. If the numbers match the token may be assumed to be authentic.

10. Clearing server's signature field 88 is used to identify the clearing server 12. Decrypting this field 88 produces the clearing server computing device's signature.

11. A unique random number field 90 holds a unique random number for each transaction session. The transaction session is the time interval starting with obtaining the token 68 and terminating when the last purchase from a particular merchant is made. The consumer 16 uses this number to test the key presented by the merchant 14 so as to determine if the merchant can be allowed to increment or decrement the value of the token 68, or update the entire token 68 with a new token 68 downloaded from the clearing server 12.

12. A merchant location field 92 is used to store coordinates of the last merchant from whom a purchase was made.

The token 68 has several security features, all of which do not have to be used at the same time. However, the present invention may be arranged such that the higher the dollar amount of the purchase, the more checks are performed on the token 68 before sending a copy to the clearing server 12 and requesting a key.

The merchant 14 modifies the token 68 with every completed transaction, using a key obtained from the clearing server 12. There are two kinds of modifications that the merchant 14 (FIG. 1) may make. The merchant may overwrite the token 68 with a new token copy received from the clearing server 12. Alternatively, the merchant may modify the token amount by decreasing the modifiable amount field 78.

After accessing the clearing server 12 and submitting or modifying previously submitted information as described above, the consumer may download the token 68. Moreover, both the consumer and the merchant will be allowed access to download a consumer side and merchant side software to their respective computing devices. Alternatively, the consumer and the merchant side programs may be provided on any computer readable medium, e.g., diskettes.

The merchant side software performs functions including the following:

1) Communicating with the consumer side software by reading the token amount 78 and modifying the token 68 with an encoding key obtained from the clearing server 12.

2) Communicating with the clearing server 12 by
   a) sending it a copy of the token 68 for further authentication;
   b) periodically uploading data on all transactions; and
   c) responding to polls and uploading aggregate purchase data on one or more consumers.

3) Maintaining the local merchant database 15 (FIG. 1) of all transactions conducted. In this merchant database 15 consumers are represented without revealing their personal or credit information.

4) Performing "tiered" authentication of the tokens 68 by performing a single check or multiple checks of the token 68 depending on the price or value of the transaction. This may involve decrypting certain fields of the token 68, and/or running specific token data through a hash function. This hashing process is first performed on the clearing server 12 and the results are encrypted and written unto the token 68. The merchant 14 decrypts the result and compares it with its own hash output. If the results differ the token 68 is not genuine. The merchants who want to increase protection for their goods or services may set the merchant side software to perform multiple token authentication. This will generally produce an increase in processing time.

Figure 4A:
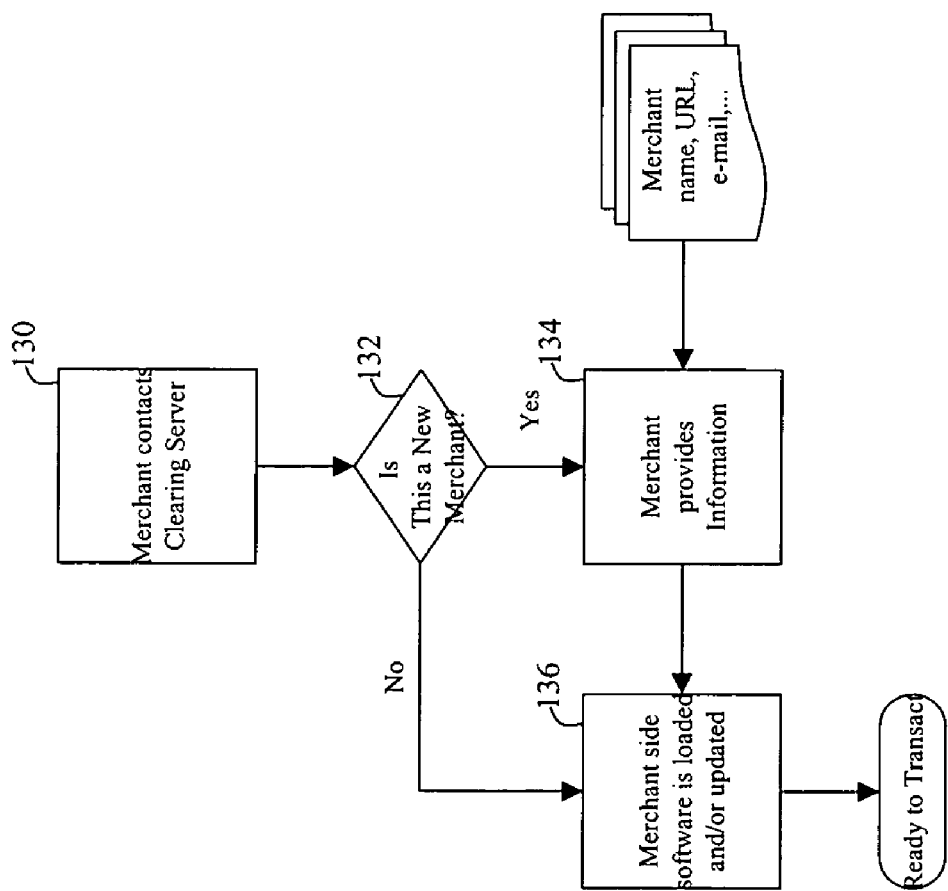
FIG. 4a is a flow diagram for registering and loading merchant side software onto a computing device.

The process of downloading the merchant side software is shown in FIG. 4a. In step 130, the merchant using the Internet browsing software connects to the clearing server 12 (FIG. 1). If in step 132 it is determined that the merchant has not been previously registered, he/she are asked to register in step 134 by providing information which is used to create a merchant record on the clearing server database 13 (FIG. 1). After registering or if previously registered, the merchant is allowed to download the merchant-side software.

Once the token 68 (FIG. 3) is purchased, the consumer side software will display a counter of the token's monetary value on the monitor of the computing device used by the consumer 14 (FIG. 1). The token 68 resides in random access memory (RAM) 34 (FIG. 2) and is therefore difficult to access. Expiration of the token 68 or shutting down or loss of power to the computing device used by the consumer 16 will result in the disappearance of the token 68 from memory 34. To re-obtain the token 68, the consumer 16 (FIG. 1) must connect to the clearing server 12, using methods described above and request their token.

As described above and is shown in FIG. 4b, the first step 102 of the registration process 100 achieves the contact or connection of the consumer 16 (FIG. 1) to the clearing server 12 (FIG. 1). In step 104 it is determined if the consumer is the first time user. In case the consumer is the first time user, in step 112 the consumer is asked to enter a credit or debit or prepaid card and other personal information. Moreover, the consumer is permitted to select the desired token amount to be purchased. This amount can range from a fixed set of monetary units, e.g., $1, $5, $10, $20, etc., to replenishable values with upper ranges. For example, a $50 token may be issued with $100 upper range. When the value of this token is depleted it may be automatically incremented to $50 until the $100 is exhausted. Offline payments can also be used for which the prospective consumer obtains a prepaid card by mail. The information is accepted and is stored in the clearing server database 13 (FIG. 1). In step 114 the token 68 is created, the customer is assigned a login name and is asked to ' select a password. The information is also stored in the clearing server database 13.

Figure 4B:
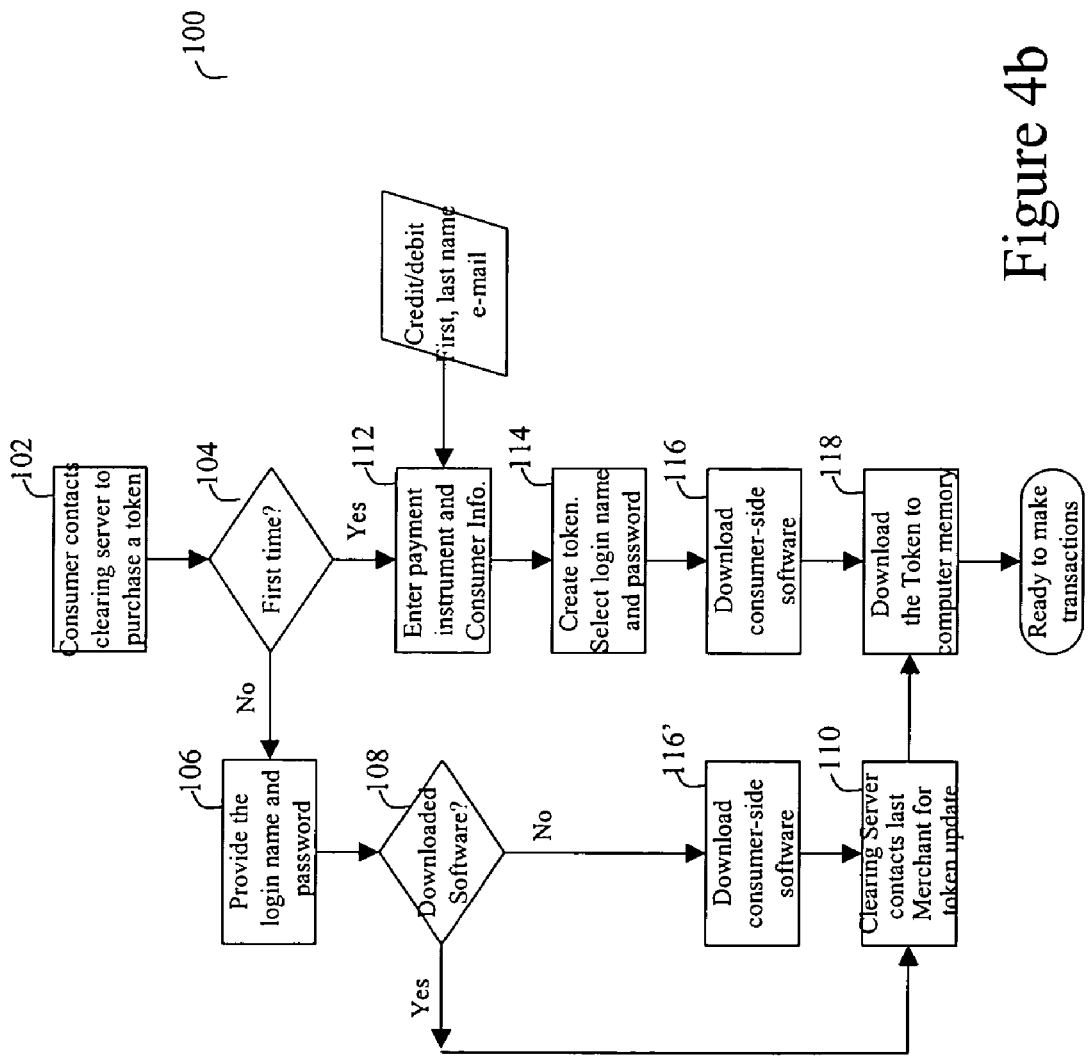
FIG. 4b is a flow diagram for registering and loading consumer side software and the token onto a computing device.
Figure 5:
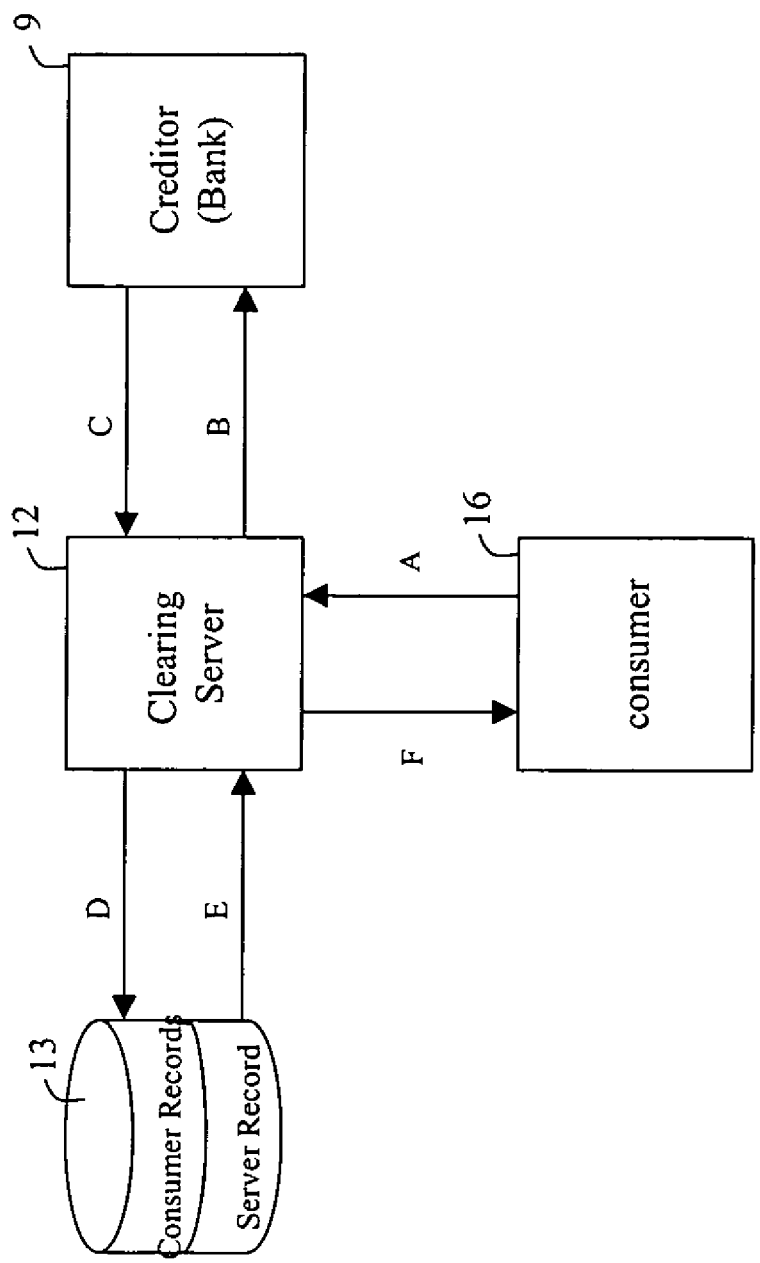
FIG. 5 is a diagram representing steps in acceptance of customer payments for tokens.

In one illustrative embodiment, shown in FIG. 5, the token creation step 114 (FIG. 4b) is achieved in the following manner. The clearing server 12 accepts customer payments for the tokens 68 (FIG. 3) in the following manner:

A. The clearing server 12 receives a token-purchase request from the consumer 16 whose payment instrument was provided to the clearing server 12 in step 112 of the registration process 100 (FIG. 4b).

B. If the instrument is a credit card or a debit instrument, a creditor who issued that instrument is contacted with the particular details provided and the token dollar amount requested by the consumer. If the payment was made by check or money order, the clearing of the instrument might be slower. Alternatively, if the payment was made with cash, the clearing server 12 will not need to contact the creditor 9, and will proceed to step "D." Similarly, if a prepaid card issued by the clearing server 12 is used, contact with the creditor 9 is not necessary. In this situation, the clearing server 12 queries its own clearing server database 13 where information regarding the prepaid card is stored.

C. The creditor 9 responds with a confirmation that the instrument has been debited.

D. The clearing server 12 will execute a "create token" query to select specific fields, comprising the token 68 from the clearing server database 13. To complete the token 68 the clearing server 12 encrypts some of the fields, appends the signature and encryption key code, and appends the current time and date.

E. This token 68 record is stored in the clearing server database 13.

F. The token is ready to be downloaded to the consumer 16 for use in commercial transactions.

Referring back to FIG. 4b, in step 116 the consumer is enabled to download the consumer side software. The consumer side software, which is downloaded to the computing device used by the consumer 16 (FIG. 1) at steps 116 and 116' of the process 100, performs the following functions of:

1. Maintaining the token in memory 34 (FIG. 2) and may store an encrypted token balance on disk 52 (FIG. 1) of the consumer's computing device 16 (FIG. 1).

2. Displaying the remaining value or dollar amount of the token. This amount may be displayed as a counter on the Internet browsing program used by the consumer.

3. Communicating with merchant side software residing on the computing device of the merchant 14 (FIG. 1) in negotiating payment.

4. Verifying genuineness of a merchant increment and decrement encoding "key."

5. Permitting the merchant side software to decrement or increment token using the verified encoding "key," and to overwrite the entire token 68.

6. Ensuring that the cash amount, incremented or decremented per transaction by the merchant, corresponds to the price displayed for the particular item or service on the computing device or website used by merchant 14.

After the consumer side software is downloaded, in step 116, the consumer is allowed to download the token into the memory 34 (FIG. 2) of the consumer 16 (FIG. 1) in step 118.

Figure 6:
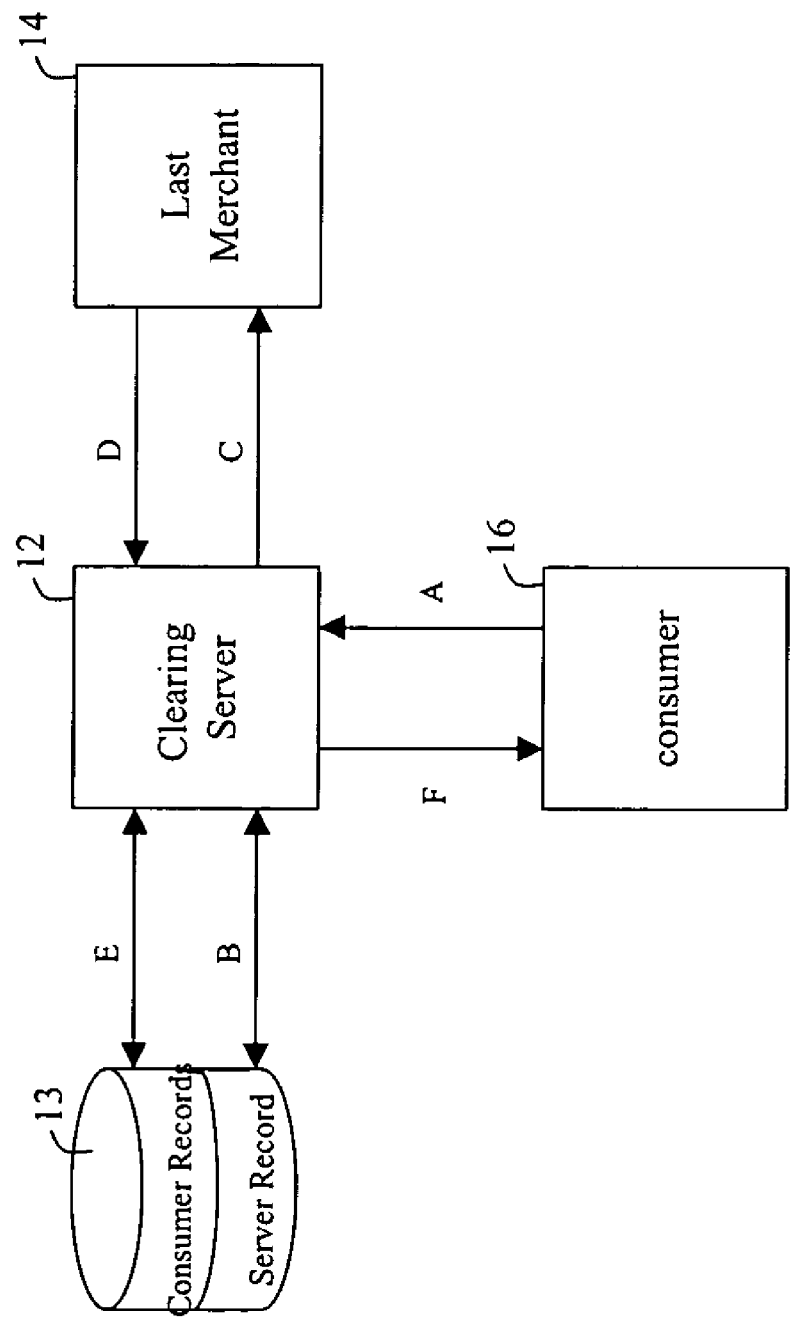
FIG. 6 is a diagram representing steps of a process to re-obtain existing tokens by the customer.

Alternatively, in step 104 it may be determined that the consumer is an existing user, the token 68 was previously created, and the consumer is now attempting to reload it. In such situation, after entering the login information in step 106, a determination is made in step 108, as to whether the consumer side software was previously downloaded. If the software was not downloaded then the process 100 proceeds to step 116' where the consumer side software is downloaded. Otherwise, and after performance of step 116', for reasons that will be made clear below, the last merchant with whom the client has transacted is contacted to retrieve the latest information regarding the last transaction. This interaction is described with reference to FIG. 6, which shows the steps of re-obtaining a previously purchased token.

The clearing server 12 contacts the merchant 14 that last transacted with the consumer 16 to determine if any transaction took place between them. The last merchant field 92 (FIG. 3) of the token 68 (FIG. 3) identifies such merchant. The clearing server 12 checks the corresponding field in its clearing server database 13 (FIG. 1), if the checked field is blank, the token has not yet been used to make any purchases and therefore merchants are not contacted.

A. The consumer 16 contacts the clearing server 12 to obtain a previously purchased token 68.

B. The clearing server 12 checks its clearing server databases 13 to retrieve that consumer's token 68 and to determine if any merchant 14 has to be contacted to obtain token updates.

If no purchase has been made by the consumer 16 using his/her token, since it was last updated, the clearing server 12 immediately proceeds to step "F" where the token 68 is released to the consumer 16.

If a purchase has been made, the clearing server 12 checks its database to see if updates have been received from that merchant 14 for such consumer purchases.

The updates are transfers of consumer purchase information including amounts of the transaction to the clearing server 12. After sending that merchant 14 a key for this particular consumer, the clearing server 12 must receive two updates from the merchant 14. If, when the update was taking place the consumer 16 was making purchases, the update may exclude some purchases. A second upload from the merchant 14 would therefore show additional transactions between the consumer 16 and the merchant 14. If however the second update does not include any more purchases from this consumer, this would indicate that the consumer did not further transact with the merchant.

C. If no updates have occurred or if update conditions are not met the clearing server 12 polls the merchant 14 for an update. If polling fails to generate information because perhaps the computing device of the merchant 14 is down or disconnected from the network 10 (FIG. 1), or there is congestion on the network 10, then token 68 is not released to the consumer computing device 16. A time limit is set for how long the merchant's 14 computing device may be allowed to be dysfunctional, after which time the token is released and any credits made to that merchant may be temporarily or permanently ignored. However to avoid financial losses due to computer failures, mechanisms are available for communicating saved transaction data to the clearing server 12 via alternative data paths, e.g., point to point connections and modem dialup.

D. The clearing server 12 receives an upload of aggregate amount spent by the consumer 16 at the merchant 14.

E. This information is used to update the token 68 in the clearing server database 13.

F. The token 68 is then downloaded to the consumer.

Operation

To recap the workings of this invention:

1. The consumer 16 (FIG. 1) purchases or retrieves the token 68 (FIG. 3) from the clearing server 12 (FIG. 1). If the token has been previously used, the last merchant 14 referenced in the token 68 is contacted and transaction information regarding the consumer 16 requesting the token is retrieved from the merchant database 15 (FIG. 1). This information verifies and assures the validity or invalidity of the token 68.

2. The consumer 16 connects to a website managed or controlled by the merchant 14 (FIG. 1) and selects goods or services to purchase and presents the token 68.

3. When the consumer 16 makes the selection the merchant 14 takes the token 68 and compares the value amount of the token 68 to the amount of the purchase. If the token value is insufficient the consumer 16 is notified and the transaction is terminated.

4. If the token dollar value appears sufficient to secure the purchase, then after performing the preliminary authentication of the token, the merchant 14 contacts the clearing server 12 to ascertain the validity of the token 68 and to receive the decrement (or increment) key. Where the token 68 has not been previously used for any purchase since it was received, only a decrement or an increment key is downloaded to the merchant 14. Where the token has been used with a least one other merchant then a key as well as a new token 68, is downloaded. The clearing server 12 determines that the token has been previously used with a different merchant if the encrypted monetary value of the token 68 and its actual present value do not match. The merchant 14 then passes the information to the consumer 16 and saves the transaction information to its database 15. The consumer 16 updates its token 68 and is ready to proceed with further purchases, continuing at step 2 or step 1 when the token value is exhausted.

Figure 7:
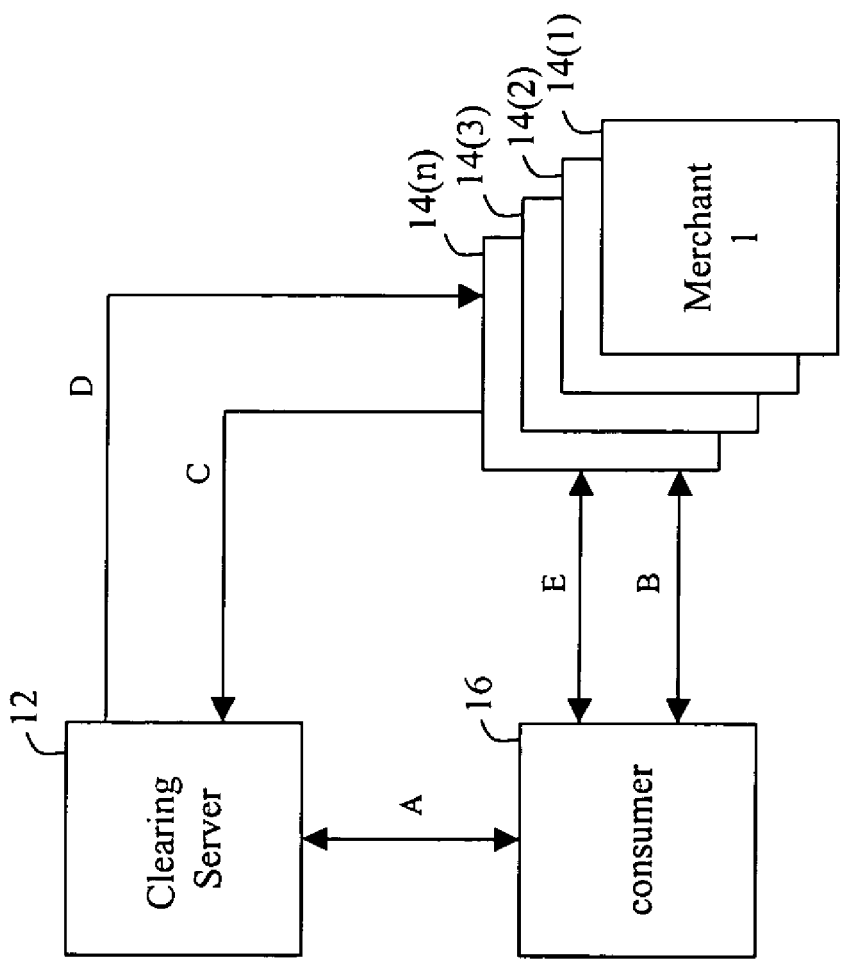
FIG. 7 is a diagram representing sequential flow of steps in performance of a transaction according to the invention.

The following is an example of the operation of the preferred embodiment of the invention. FIG. 7 shows the communications between the transacting parties, the clearing server 12 the merchants 14 and the consumer 16, from the individual consumer 16 perspective.

A. The consumer connects to the clearing server 12, purchases the token 68 (FIG. 3) of a particular value, by paying with a credit, debit, or prepaid card. Alternatively the payment may be made with cash, check and/or money order. First time users would be requested to enter specific consumer information such as first name, last name, email address, city, country, login name. Consumers who pay with a previously purchased prepaid card would enter a number on the card. This card number represents an anonymous consumer record pre-created on the clearing server database 13 (FIG. 1). When paying with the pre-paid card, the consumer will not be asked to enter personal information. The prepaid card may reference an email address, which the consumer can access using the prepaid card number. This email address may be used to send and receive information from the clearing server 12 as well as for transaction dispute resolution.

All the consumer's information is saved in the clearing server databases 13. The clearing server 12 creates a token 68 specific to the consumer by selecting information from that consumer's information. The information on the token 68 comprises encrypted consumer information, token amount, authentication data such as a random number, a date/time field, and the clearing server's encrypted signature.

The token 68 (FIG. 3) and the consumer side software, i.e., for first-time users, is downloaded to the consumer 16. The consumer side software loads the token 68 into memory 34 (FIG. 2), making it inaccessible to other applications executing on the computing device used by the consumer 16. The token balance amount is displayed to the consumer.

B. The consumer 16, using commonly available Internet browsing programs, visits any participating merchant 14. The participating merchant must have registered with the client server 12 and installed the merchant side software as described above with reference to FIG. 4a. The consumer 16 may enter into commercial transactions, e.g., for purchases of goods and services, with the merchant 14. Transactions may be performed for any range of items. Some items may be obtained immediately, e.g., downloading of digital multimedia files and spending time in a chat room, other items may be delivered in the future, e.g., books, or services consumed over time.

The transaction prices may be displayed by the merchants 14 next to each product. A description, small version, or a thumbnail of the product may be provided with its price. The consumer may negotiate the price with the merchant or accept it by clicking on the description or the thumbnail. The merchant side software communicates with the consumer side software to retrieve the token 68 (FIG. 3) and to perform basic authentication to determine, for example, if the token 68 has an adequate balance for the intended transaction. The authentication is performed by checking the clearing server's encrypted signature 88 (FIG. 3). Additionally, the merchant 14 determines if the token has been updated by the clearing server 12.

C. When the consumer elects to make a purchase, the payment is made immediately, in real-time, and the token amount visible to the consumer 16 is decremented by the amount of the purchase. The amount may be incremented if credit is provided to the consumer 16. The consumer side software allows the consumer 16 to generate a record of the amount spent and the URL of the merchant 14 where the amount was spent. After transacting with one merchant 14(1) the consumer 16 may connect to other merchants 14(2) and repeat the actions described in step "B."

A copy of the token 68 is forwarded to the clearing server 12 together with a request for a decrement key. Where the merchant 14 wishes to credit the token 68, a copy of the token 68 is forwarded with a request for an increment key. The crediting transaction requires that the merchant 14 maintain a credit balance in its account on the clearing server 12. This credit may be created identical to the debiting of the token 68.

The clearing server 12 authenticates the token 68 (FIG. 3) by decrypting and checking the encrypted fields, including the date/time field 76 (FIG. 3), and by comparing data on the token 68 with matching data in the clearing server database 13 (FIG. 1). If the token is determined to be authentic, the clearing server 12 writes the merchant ID 84 (FIG. 3) of the requesting merchant 14 on the token 68 and unto the clearing server database 13 (FIG. 1). A key with which the merchant 14 can decrement or increment the token is then created. This key may be created using any commonly available random number generator. This key may allow the merchant 14 to decrement or increment the token amount for contiguous transactions with the same consumer 16 without re-authentication.

Contiguous transactions may include several purchases performed one after another from the same merchant 14. The consumer 16 may not (a) shut down their computing device between purchases, or (b) make intervening transactions with other merchants 14. Any such action breaks the continuity and a new key will be required.

(a) Where the consumer 14(1) shuts down the computing device, the token 68 must be re-obtained from the clearing server 12. At retrieval the token 68 is assigned a new random number.

(b) If the consumer makes a purchase from a different merchant 14(2), that merchant 14(2) downloads a key from the clearing server 12, which first overwrites the existing token 68 with a new token 68 and then decrements the new token 68. The new token 68, which is downloaded along with the key, will have a new random number. In other words, the second merchant 14(2) first overwrites the consumer's existing token before decrementing it.

D. The merchant 14 receives the decrement key and notifies the consumer side software to decrement the token value. The consumer side software uses an embedded algorithm to compare the decrement key with the random number 90 (FIG. 3). If the entire key matches, the entire token 68 (FIG. 3) is overwritten. If only specific positions on the key match then only the token amount is decremented. The following example illustrates the conceptual basis of key algorithms a variety of which can be used in conjunction with the present invention. The consumer side software checks the key and determines whether to permit an overwrite operation, a decrement operation, or an increment operation.

If the token 68 has a random number "123456789" then the overwrite key could be a matching number "123456789," while the decrement key could be "1234z56789" where the fourth number "4" is non-matching and is replaced with "z." An increment key could be "1234567q9," where the eighth number "8" is non-matching and is replaced with "q".

E. After token 68 (FIG. 3) is decremented, the consumer is allowed to receive the goods, e.g., download a file. Just before the token value is decremented, the consumer 16 may be prompted to enter the password, if the correct password is entered the token is decremented and the goods are released. This feature may be turned off or on as the consumer requires. For each transaction, the consumer side software only permits decrements or increments of the token 68 in the amount of the price received from the merchant. This price is either displayed or negotiated with the merchant 14. Following the transaction, the new token balance is displayed to the consumer 16 (FIG. 1).

Figure 8A:
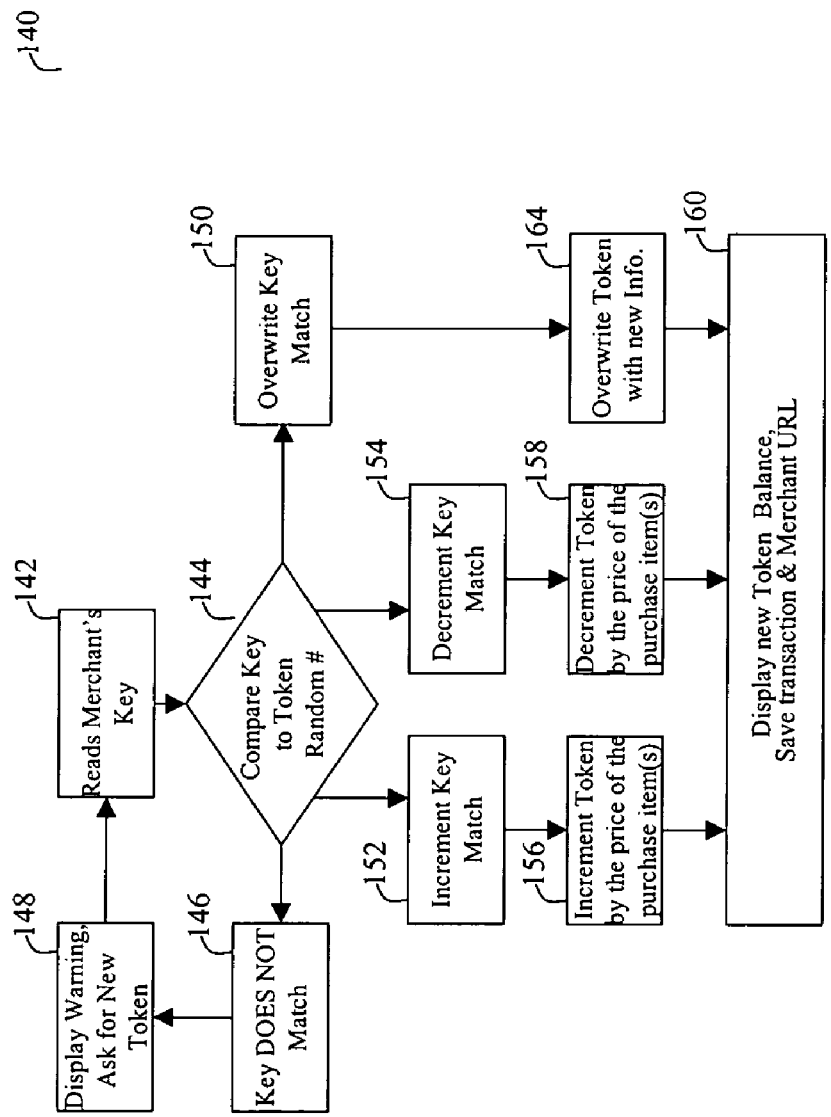
FIGS. 8a and 8b are flow diagrams describing the operation of the consumer-side and the clearing server software components of the invention.

An illustrative example of the functionality of the consumer side software 140 is shown in FIG. 8a. Merchant 14 provides a key, which, if correct, enables the consumer side software 140 to perform updates of the token 68. In step 142 the key is accepted and is matched against the random number provided on the token 68. The way the key matches the random number determines whether an overwrite, a decrement or an increment operation will be performed. In step 144 the key is matched, and the type of operation is determined. Step 146 indicates that the key does not match at all. In step 148 a warning is displayed or the token is locked after several wrong keys are presented by the merchant 14. The URL of the merchant 14 is saved and a warning message is displayed. The locking of the token 68 halts all operations for a time if there are repeated failed attempts to increment, decrement or overwrite the token. The duration of such lockout is adjustable.

An overwrite key will be matched in step 150 and the token 68 will be overwritten in step 164 when the merchant will provide an overwrite key and a new token 68. This situation will arise when the token 68 has been previously used with a different merchant and the original face value of the token 68 and its actual present value do not match. Otherwise, the increment/decrement keys will be matched in steps 152, 154 and the token 68 will be managed accordingly in steps 156, 158. In step 160 the new token balance will be displayed and the visited merchant 14 URLs or IDs and purchases made will be saved. The consumer may be required to enter password for each transaction or to enter a password for transactions exceeding a certain amount.

Figure 8B:
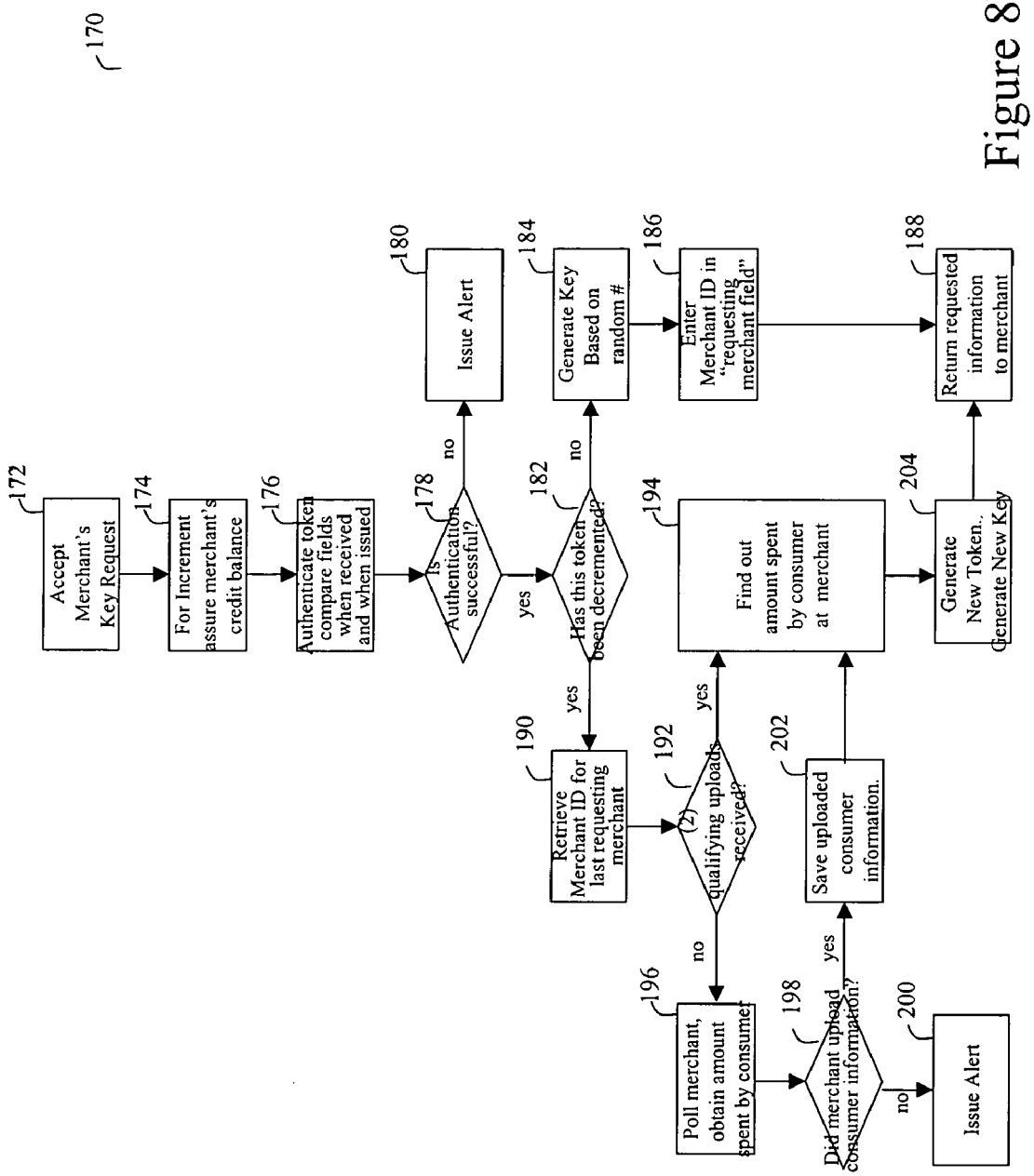

In order to provide the key to enable the consumer side software 140 to perform updates of the token 68, merchant 14 must first receive it from the clearing server 12. An illustrative example of this functionality, is presented as process 170, is shown in FIG. 8b. In step 172, the clearing server receives the request for the key from the merchant 14. If the request is for the increment key, to credit the consumer 16, in step 174, merchant's balance with the clearing server is checked to verify sufficiency of funds. In step 176, the token provided by the merchant along with the request for the key is authenticated. The authentication may be achieved by comparing all or select fields of the merchant provided token and the original fields of the clearing server database 13 (FIG. 1) records used to create the token 68 provided to the consumer 16. If in step 178, it is determined that the authentication is not successful, appropriate parties will be alerted to that fact in step 180.

If the token is authentic, in step 182 it is determined if it has been previously decremented. This is achieved by comparing the present value of the token and the encrypted original value, another way to achieve this is to dedicate a bit on the token, which is set on or off when the token is used. If the token has not been previously decremented, the requested increment/decrement key is generated in step 184, the merchant information is stored in step 186, and in step 188, the key is given to the merchant 14.

Figure 9:
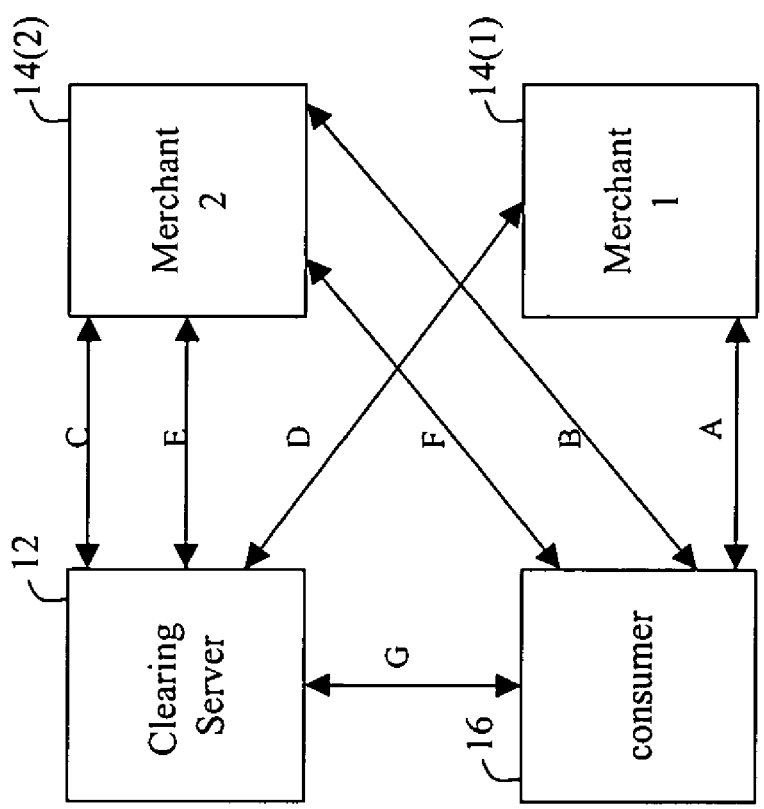
FIG. 9 is a diagram representing sequential flow of steps in performance of a transaction, after loss of a token, according to the invention.

If the token has been previously decremented, the last requesting merchant ID is retrieved in step 190, and the clearing server database 13 is checked to see if there were sufficient qualifying uploads from that merchant. If there were, the amount spent by the consumer is ascertained in step 194, and in step 204 a new token 68 as well as the requested key is generated and returned to the merchant in step 188. Please recall that the merchant will in its turn forward this information to the consumer 16. The new token will be passed along to the consumer 16 with an overwrite key. If there were not sufficient qualifying uploads, the merchant 14 is polled in step 196 to obtain amount spent by the consumer. If the merchant did not upload consumer information, as determined in step 198, appropriate parties will be alerted to that fact in step 200. Otherwise the consumer information is stored in step 202 and the processing of program 170 continues from step 194.

Where the consumer 16 loses the token 68 (FIG. 3) before completing a series of transactions, e.g., by shutting down the computer. The token 68 (FIG. 3) may be retrieved from the clearing server 12. To better explain transactions with multiple merchants 14 please refer to FIG. 9.

A. The consumer 16 leaves merchant 14(1) after making purchases and connects to another merchant 14(2). The field holding the modifiable token balance 78 (FIG. 3) has been decreased by the amount of the purchase from the last merchant 14(1). All purchases are also recorded by the merchant side software of the last merchant 14(1) in its database 15 (FIG. 1) and on the token 68 (FIG. 3) via decrements performed with the decrement key. All credits are likewise recorded in the merchant database 15 (FIG. 1) and applied to the token 68 using the increment key. At this point the clearing server 12 has not been provided with any information and is unaware of how much the consumer 16 has spent. However, the token amount field 78 modified by the last merchant 14(1) and the encrypted amount field 82 (FIG. 3) are different.

B. The consumer then connects to another merchant 14(2) to make additional transactions. The merchant side software authenticates the token 68.

C. The clearing server 12 is contacted by the merchant 14(2), and provided with a copy of the token 68 and a request for a decrement key with which to decrement the token value. Alternatively, as mentioned above an increment key may be requested. The clearing server 12 authenticates the token and then decrypts the "encrypted token amount field" 82 (FIG. 3). If this amount is different from the modifiable token amount field 78 (FIG. 3) the decrements have been performed.

D. Using the ID of the last merchant field 84 (FIG. 3) value, in the present example the first merchant 14(1), the clearing server 12 polls merchant 14(1) and obtains total amount of purchases made by the consumer 16. This amount is then subtracted from the original encrypted amount field 82 (FIG. 3). The new amount should match the amount in the modifiable amount field 78 (FIG. 3). This amount is encrypted and is written back to the encrypted token amount field 82 (FIG. 3). The clearing server 12 generates a new token 68 (FIG. 3) with a new correct token amount, 78 (FIG. 3) a new time stamp 76 (FIG. 3), having ID of merchant 14(2) in the last merchant field 84, and a new random number 90 (FIG. 3). A decrement key is then generated using this random number and the last merchant ID, the consumer and merchant databases 13 (FIG. 1) are updated with the new data. Where a comparison of encrypted and modifiable amount fields 78, 82 shows that an increment has occurred, a similar process is pursued except that additionally, previous merchant's 14(1) account is decreased by the amount of the increment or credit applied to the consumer.

The merchants 14 are required to periodically upload all their transactional data so that the clearing server database 13 (FIG. 1) may be accurately updated and new tokens created on the clearing server 12. If this upload was performed immediately prior to the inquiry described in step "D" it may be unnecessary to poll the last merchant 14(1).

At least two uploads must have been received from the previous merchant 14(1) since the creation of the token 68 (FIG. 3), i.e., uploads after the time stamped in field 76 (FIG. 3). The first upload must have an entry for the consumer 16 and the second must not. That is because, if the consumer was still making purchases from merchant 14(1) after the first upload, then that first upload would not capture all purchases made from merchant 14(1). However if a second upload, has no entries from the consumer 16, but the first upload does, it means that the consumer made no purchases after the first upload. Therefore, the data from the first upload is reliable and may be used to create the token 68 and update the clearing server database 13 (FIG. 1).

E. The token 68 and the decrement key are then downloaded to the merchant 14(2).

F. The merchant side software then contacts the consumer side software and "shows" the new key. The token 68 on the consumer 16 is overwritten and then the new token amount field 78 (FIG. 3) is decremented by the amount of the purchase. Additional decrements may then be performed without contacting the clearing server 12 for additional consequential purchases from the last merchant 14(2).

G. For various reasons, the consumer 16 may wish to begin a new session, e.g., a shutdown of a computing device has occurred. The consumer 16 must connect to the clearing servers 14 and retrieve their token 68. The clearing servers 14 check their clearing server databases 13 (FIG. 1) to identify the last merchant 14 visited. If sufficient uploads have been received from that merchant 14, please see discussion of sufficient uploads above, the clearing server 12 may use the information from those uploads to create a new token 68 for the consumer 16. If the uploads were not sufficient, the clearing server 12 polls the last merchant 14 and uploads total amount spent by the particular consumer 16. In either case the information is used to update the token amount 78 (FIG. 3) and the clearing server database 13. Thereafter a new token is 68 is created.

It should be noted that although the consumer side and the merchant side software has been described as residing on separate computing devices, the software may be co-resident on the same computing device. Such configuration may allow different entities, e.g., merchant and consumer, to perform as both, the merchant and as the consumer. Additionally, the clearing server 12 may be co-resident on a merchant 14. This configuration may significantly reduce networking traffic overhead.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

I claim:

1. A method of performing at least one transaction between a consumer from a plurality of consumers and a merchant from a plurality of merchants, the plurality of consumers and the plurality of merchants utilizing computing devices connected to a network, said method comprising the steps of:
   providing a token to at least one clearing server during a transaction with a merchant, the token having an indicated value;
   communicating a request for an update key to said at least one clearing server during the transaction with the merchant;
   ascertaining, during the transaction with the merchant, an amount paid by the consumer to a previous merchant by polling the previous merchant to obtain the amount, the previous merchant being an entity distinct from the clearing server;
   verifying the value of the token utilizing the ascertained amount paid by the consumer to the previous merchant;
   providing said update key, said update key being used as an authorization to modify the value of said token.

2. The method of claim 1, wherein said step of providing said token comprises a step of the consumer purchasing said token from said at least one clearing server, said at least one clearing server using computing devices connected to the network.

3. The method of claim 2, wherein said purchasing step is performed by the consumer providing to said at least one clearing server personal information regarding the consumer and financial information regarding a payment instrument to be used by the consumer.

4. The method of claim 3, wherein said payment instrument is a credit card.

5. The method of claim 3, wherein said payment instrument is a cash card.

6. The method of claim 1, wherein the step of providing said token comprises a step of the consumer retrieving a previously purchased token from said at least one clearing server.

7. The method of claim 1, wherein said step of providing said token further comprising a step of selecting for purchase at least one quote from a plurality of quotes of goods and services, said plurality of quotes of goods and services and their prices being displayed on the computing devices utilized by the plurality of merchants.

8. The method of claim 7, wherein said step of providing said token further comprising a step of presenting to the merchant said token and said selected for purchase at least one quote.

9. The method of claim 8, further comprising steps of:
combining into a total price prices of all said selected for purchase at least one quote;
rejecting said transaction if a value of said token is less then the said total price; and
communicating to said at least one clearing server said token, said total price, and a request for said update key.

10. A method of performing at least one transaction between a consumer from a plurality of consumers and a merchant from a plurality of merchants, each of said plurality of consumers and each of said plurality of merchants utilizing one or more computing devices, the one or more computing devices being connected to a network, said method comprising the following steps of:
the consumer receiving a token from a clearing server, the token having a value;
the consumer selecting for purchase at least one quote from a plurality of price quotes of goods and services, said plurality of price quotes of goods and services being displayed on the computing devices utilized by the plurality of merchants;
the consumer communicating a request for a purchase to the merchant during a transaction with the merchant, the merchant being an entity distinct from the clearing server;
the merchant, during the transaction with the merchant, communicating a request for an update key from the clearing server, said update key being used as an authorization to modify the value of the token;
ascertaining, during the transaction with the merchant, an amount paid by the consumer to a previous merchant by polling the previous merchant to obtain the amount and verifying the value of the token utilizing the ascertained amount paid by the consumer to the previous merchant; and
providing said update key to the merchant to enable the merchant to modify the value of the token.

11. The method of claim 10, wherein said step of the consumer receiving said token further comprises a step of maintaining said token in only random access memory of the one or more computing devices.

12. The method of claim 11, wherein said step of the consumer selecting further comprises a step of the consumer establishing at least one data path from the one or more computing devices used by the consumer to the one or more computing devices used by the merchant.

13. The method of claim 12, wherein said step of the consumer communicating said request further comprising a step of the consumer forwarding said token from the one or more computing devices used by the consumer to the one or more computing devices used by the merchant.

14. The method of claim 13, wherein said step of the merchant communicating a request for said update key further comprising a step forwarding said token from the one or more computing devices used by the merchant to a clearing server, said clearing server using one or more computing devices.

15. The method of claim 14, wherein said step of ascertaining an amount paid further comprising a step of comparing said token forwarded by said merchant to said token received by the consumer to establishing whether said token has been previously used.

16. The method of claim 15, wherein said step of providing said update key further comprising a step of sending said update key from the one or more computing devices used by said clearing server to the one or more computing devices used by the merchant.

17. A computer program device readable by a machine, tangibly embodying a program of instructions executable by a machine to perform method steps for performing at least one transaction between a consumer from a plurality of consumers and a merchant from a plurality of merchants, each of said plurality of consumers and each of said plurality of merchants utilizing one or more computing devices, the one or more computing devices being connected to a network, said method comprising the following steps of:
the consumer receiving a token from a clearing server that is separate and distinct from each of the plurality of merchants;
the consumer selecting for purchase at least one quote from a plurality of price quotes of goods and services, said plurality of price quotes of goods and services being displayed on the computing devices utilized by the plurality of merchants;
the consumer, during a transaction with the merchant, communicating a request for a purchase to the merchant;
the merchant, during the transaction with the merchant, communicating a request for an update key, said update key being used as an authorization to modify the value of the token;
ascertaining, during the transaction with the merchant, an amount paid by the consumer to a previous merchant by polling the previous merchant to obtain the amount and verifying a value of the token utilizing the ascertained amount paid by the consumer to the previous merchant; and
providing said update key to the merchant to enable the merchant to modify the token.

18. A method of performing a transaction between a consumer and a merchant, comprising the steps of:
providing an electronic token from the consumer to the merchant as part of a commercial transaction, the token having a value;
providing, during the commercial transaction, the token from the merchant to a clearing server that is separate and distinct from the merchant;
determining, during the commercial transaction, by the clearing server whether the token was previously used by the consumer to verify the value of the token by polling a previous merchant from which the consumer made a previous purchase with the token, receiving information from the previous merchant about the previous purchase, modifying a value of the token as maintained at the clearing server, and verifying that the modified value of the token as maintained at the clearing server matches the value of the token provided from the merchant to the clearing server;

providing an update key from the clearing server to the merchant; and using the update key to modify the value of the token.

19. The method of claim 18, wherein the step of using the update key is carried out by providing the update key from the merchant to the consumer and modifying the value of the token held by the consumer using information stored on the update key.

20. The method of claim 18, further comprising the step of purchasing a token by the consumer from the clearing server.

21. The method of claim 20, wherein the step of purchasing includes providing the token to the consumer; and the method further comprises the step of providing the token a second time to the consumer from the clearing server.

22. The method of claim 20, wherein the step of purchasing a token includes the step of maintaining the purchased token only in random access memory of a computing device of the consumer.

23. The method of claim 20, wherein the step of purchasing includes supplying the token to a computing device of the consumer and maintaining the token in a memory of the computing device; and the method further comprises the step of supplying the token again to the computer device from the clearing server after the memory of the computing device loses the maintained token.

24. The method of claim 23, wherein the step of maintaining the token in a memory of the computing device is carried out by maintaining the token only in a random access memory of the computer device.

25. The method of claim 20, wherein the step of purchasing includes supplying the token to a computing device of the consumer and maintaining the token in a memory of the computing device; and the method further comprises the step of supplying the token again to the computer device from the clearing server after the token expires.

26. The method of claim 18, wherein the step of providing an update key from the clearing server to the merchant is carried out after verifying that the modified value of the token as maintained at the clearing server matches the value of the token provided from the merchant to the clearing server.

* * * * *